United States Patent
Takabatake (10) Patent No.: US 7,741,608 B2
(45) Date of Patent: Jun. 22, 2010

(54) IMAGE READER

(75) Inventor: Masanari Takabatake, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 12/195,097

(22) Filed: Aug. 20, 2008

(65) Prior Publication Data

US 2009/0200477 A1 Aug. 13, 2009

(30) Foreign Application Priority Data

Feb. 13, 2008 (JP) ............................. 2008-031722

(51) Int. Cl.
*H01L 27/146* (2006.01)
*G01J 1/42* (2006.01)
*G01N 21/64* (2006.01)

(52) U.S. Cl. ................ 250/370.08; 250/372; 250/461.1

(58) Field of Classification Search ............ 250/370.08, 250/372, 461.1
See application file for complete search history.

(56) References Cited

U.S. PATENT DOCUMENTS

2006/0062572 A1* 3/2006 Sakaguchi .................. 396/639

2007/0216976 A1* 9/2007 Endo et al. ..................... 359/2

FOREIGN PATENT DOCUMENTS

| JP | 06-139339 B2 | 5/1994 |
| JP | 06-186649 B2 | 7/1994 |
| JP | 11-205538 A | 7/1999 |

* cited by examiner

*Primary Examiner*—David P Porta
*Assistant Examiner*—Mindy Vu
(74) *Attorney, Agent, or Firm*—Lowe Hauptman Ham & Berner LLP (57) ABSTRACT

In an image reader, if a first and second light sources alternately light-up when a conveying unit conveys an imaging target medium, a visible light data group that is based on a reflected light, of a wavelength inside a visible spectrum, of a first light having a wavelength inside the visible spectrum and a visible light external data group that is based on the reflected light, of the wavelength inside the visible spectrum, of a second light having a wavelength outside the visible spectrum are alternately generated. By scanning the imaging target medium once and by collecting multiple visible light data group, first image data of the imaging target medium, based on the first light, is generated. Furthermore, by collecting multiple visible light external data group, second image data of the imaging target medium, based on the second light, is also generated.

2 Claims, 8 Drawing Sheets

CONVEYING DIRECTION
(VERTICAL SCANNING DIRECTION)

FIG.1

CONVEYING DIRECTION
(VERTICAL SCANNING DIRECTION)

CONVEYING DIRECTION
(VERTICAL SCANNING DIRECTION)

FIG.8

IMAGE READER

RELATED APPLICATIONS

The present application is based on, and claims priority from, Japan Application Number 2008-031722, filed Feb. 13, 2008, the disclosure of which is hereby incorporated by reference herein in its entirety.

BACKGROUND OF THE INVENTION

1. Field of the Invention

The present invention relates to an image reader that reads an image on an imaging target medium.

2. Description of the Related Art

An image reader that reads or scans an image recorded on an original (imaging target medium) has been developed. Examples of image readers are disclosed in Japanese Patent No. 3227231, Japanese Patent No. 3292392, and Japanese Patent Application Laid-open No. H11-205538.

In the existing image readers disclosed earlier, if a visible light, which is a light of a wavelength inside a visible spectrum, irradiating an original and an image of a reflected light, which is based on the visible light, of the wavelength inside the visible spectrum, is picked up by a first imaging unit, image data picked-up by the first imaging unit based on the light of the wavelength inside the visible spectrum is generated. Moreover, if a light such as an ultraviolet light of a wavelength outside the visible spectrum irradiates the original and an image of a reflected light, which is based on the light such as the ultraviolet light, of the wavelength outside the visible spectrum is picked up by a second imaging unit, image data picked-up by the second imaging unit based on the light of the wavelength outside the visible spectrum is generated. Thus, the picked-up image data that is based on the light of the wavelength inside the visible spectrum and the picked-up image data that is based on the light of the wavelength outside the visible spectrum can be generated.

However, in the existing image readers disclosed earlier, for generating the picked-up image data that is based on the light of the wavelength inside the visible spectrum and the picked-up image data that is based on the light of the wavelength outside the visible spectrum, an imaging target portion of the original needs to be reciprocated along a vertical scanning direction. In the existing image readers disclosed earlier, for example, the visible light needs to irradiate the original while moving the imaging target portion, of the original, that is captured as an image by the imaging unit in an outward direction along the vertical scanning direction and the picked-up image data, based on the light of the wavelength inside the visible spectrum, needs to be generated by using the resulting reflected light. Furthermore, the ultraviolet light needs to irradiate the original while moving the imaging target position of the original in a homeward direction along the vertical scanning direction and the picked-up image data, based on the light of the wavelength outside the visible spectrum, needs to be generated by using the resulting reflected light. Thus, for generating the picked-up image data that is based on the light of the wavelength inside the visible spectrum and the picked-up image data that is based on the light of the wavelength outside the visible spectrum from the original, the imaging target portion of the original needs to be moved (scanned) along the vertical scanning direction for the number of times.

SUMMARY OF THE INVENTION

It is an object of the present invention to at least partially solve the problems in the conventional technology.

According to an aspect of the present invention, an image reader includes a first light source that irradiates an imaging target medium with a first light of a wavelength inside a visible spectrum; a second light source that irradiates the imaging target medium with a second light of a wavelength outside the visible spectrum; an imaging unit that captures, based on a reflected light of the wavelength inside the visible spectrum from the imaging target medium, an image of the imaging target medium; a conveying unit that conveys the imaging target medium to the imaging unit; and an image-data generating unit that generates, based on the reflected light, of the wavelength inside the visible spectrum, corresponding to the first light reflected on the imaging target medium when the imaging target medium is irradiated by only the first light, a visible light data group corresponding to a portion of the imaging target medium that is captured by the imaging unit, and first image data corresponding to the imaging target medium by collecting the multiple generated visible light data group, and generates, based on the reflected light, of the wavelength inside the visible spectrum, corresponding to the second light reflected on the imaging target medium when the imaging target medium is irradiated by only the second light, a visible light external data group corresponding to a portion of the imaging target medium that is captured by the imaging unit, and second image data corresponding to the imaging target medium by collecting the multiple generated visible light external data group. Further, the first light source and the second light source alternately light-up at the time of conveying the imaging target medium by the conveying unit.

The above and other objects, features, advantages and technical and industrial significance of this invention will be better understood by reading the following detailed description of presently preferred embodiments of the invention, when considered in connection with the accompanying drawings

DETAILED DESCRIPTION OF THE PREFERRED EMBODIMENTS

Exemplary embodiments of the image reader according to the present invention are explained in detail below with reference to the accompanying drawings. An image reader 10 according to embodiments of the present invention is explained in detail below. However, the present invention is not to be thus limited.

Figure 1:
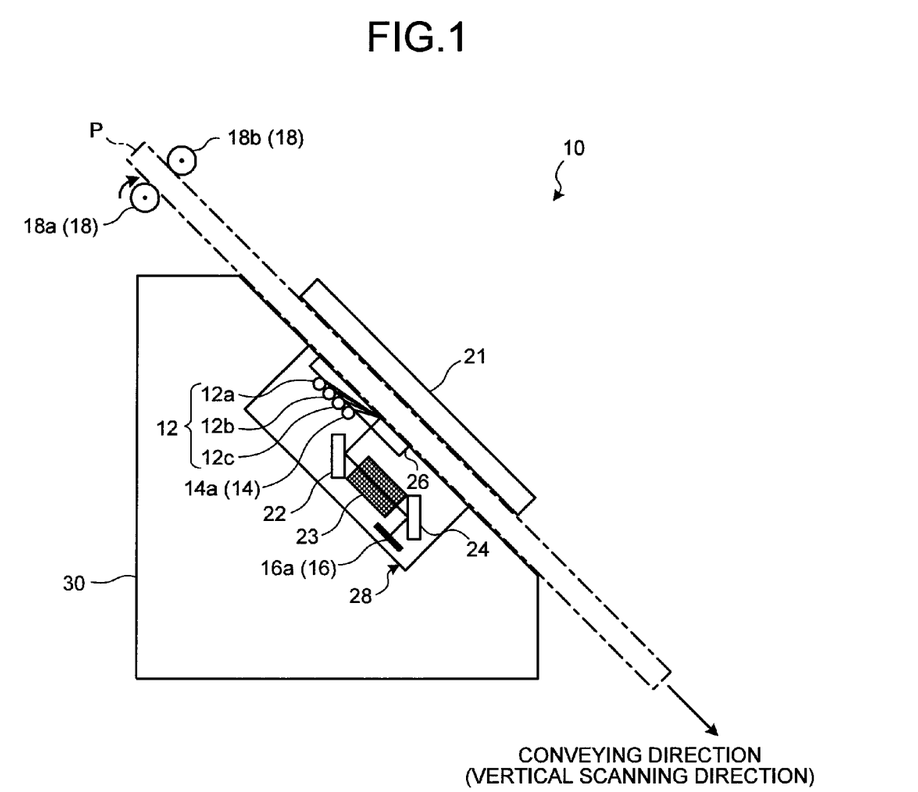
FIG. 1 is a schematic diagram for explaining an overview of an image reader according to a first embodiment of the present invention.
Figure 2:
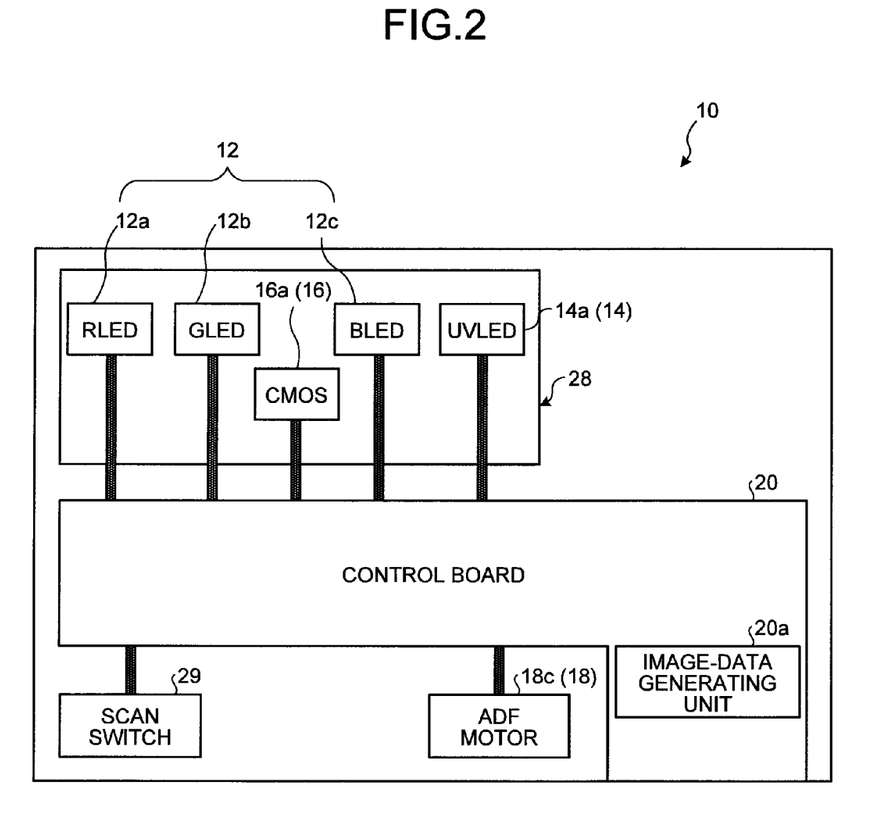
FIG. 2 is a block diagram of the image reader according to the first embodiment.

FIG. 1 is a schematic diagram for explaining an overview of the image reader 10 according to a first embodiment of the present invention. FIG. 2 is a block diagram of the image reader 10.

The image reader 10 includes a first light source 12, a second light source 14, an imaging unit 16, a conveying unit 18, a control board 20 as an image-data generating unit, and a white reference plate 21.

The first light source 12 irradiates an imaging target medium P with a first light of a wavelength inside a visible spectrum. In the present embodiment, the first light source 12 includes a red light emitting diode (RLED) 12a that emits an R (Red) light, a green light emitting diode (GLED) 12b that emits a G (Green) light, and a blue light emitting diode (BLED) 12c that emits a B (Blue) light.

The second light source 14 irradiates the imaging target medium P with a second light of a wavelength outside the visible spectrum. In the present embodiment, the second light source 14 includes an ultraviolet LED (hereinafter, called "UVLED") 14a that emits an ultraviolet (UV) light. When the second light of the wavelength outside the visible spectrum is considered as the ultraviolet light, a reflected light, of the wavelength inside the visible spectrum, from the imaging target medium P becomes fluorescent.

In the present embodiment, the RLED 12a, the GLED 12b, the BLED 12c, and the UVLED 14a are respectively connected to the control board 20. Power is supplied from the control board 20 to light-up the RLED 12a, the GLED 12b, the BLED 12c, and the UVLED 14a. To be specific, upon the control board 20 supplying power to the RLED 12a, the GLED 12b, the BLED 12c, and the UVLED 14a, the RLED 12a, the GLED 12b, the BLED 12c, and the UVLED 14a respectively irradiates the imaging target medium P, the R light that is the first light of the wavelength inside the visible spectrum, the G light that is the first light, the B light that is the first light, and the ultraviolet light that is the second light of the wavelength outside the visible spectrum. In the present embodiment, the wavelength of the R light ranges between approximately 620 nanometer (nm) and approximately 640 nm, the wavelength of the G light ranges between approximately 510 (nm) and approximately 540 nm, the wavelength of the B light ranges between approximately 450 nm and approximately 480 nm, and the wavelength of the ultraviolet light ranges between approximately 200 nm and approximately 380 nm. In the present embodiment, the wavelength of the ultraviolet light is, for example, considered as 360 nm.

The imaging unit 16 captures an image of the imaging target medium P based on the reflected light, of the wavelength inside the visible spectrum, from the imaging target medium P. In the present embodiment, an image sensor 16a that is a line sensor is used as the imaging unit 16. The image sensor 16a is formed of a complementary metal oxide semiconductor (CMOS) that responds to the light of the wavelength inside the visible spectrum and outputs an analog value according to a gradation of the reflected light. The image sensor 16a is formed of a plurality of imaging elements arranged in a single row in a main scanning direction that is orthogonal to a conveying direction of the imaging target medium P.

The image sensor 16a forms an imaging unit 28 along with the RLED 12a, the GLED 12b, the BLED 12c, the UVLED 14a, a mirror 22 that reflects the reflected light or fluorescence from the imaging target medium P to the image sensor 16a, a mirror 24 that reflects the reflected light from the mirror 22 via a lens 23 to the image sensor 16a, and an image-reading supporting plate 26 for capturing the image of the imaging target medium P by using the light from the RLED 12a, the GLED 12b, the BLED 12c, and the UVLED 14a. When the RLED 12a, the GLED 12b, the BLED 12c, and the UVLED 14a light-up, the image sensor 16a picks up via the mirrors 22 and 24, an image of the reflected light or the fluorescence corresponding to the respective light irradiating a portion, from the imaging target medium P, facing the image-reading supporting plate 26.

Thus, the image sensor 16a outputs to an image-data generating unit 20a of the control board 20, an R output value of each imaging element corresponding to the R light on the portion of the imaging target medium P that is captured as the image when the RLED 12a is lit-up, a G output value of each imaging element corresponding to the G light on the portion of the imaging target medium P that is captured as the image when the GLED 12b is lit-up, a B output value of each imaging element corresponding to the B light on the portion of the imaging target medium P that is captured as the image when the BLED 12c is lit-up, and an ultraviolet fluorescence output value (hereinafter, called "UV fluorescence output value") of each imaging element corresponding to the ultraviolet light on the portion of the imaging target medium P that is captured as the image when the UVLED 14a is lit-up.

The conveying unit 18 conveys the imaging target medium P to the imaging unit 16. The conveying unit 18 includes a driving roller 18a, a driven roller 18b, and an automatic document feeder (ADF) motor 18c. The driving roller 18a applies a force to the imaging target medium P in the conveying direction (the vertical scanning direction of the imaging target medium P). The driven roller 18b that is parallel to the driving roller 18a conveys the imaging target medium P that is sandwiched between the driven roller 18b and the driving roller 18a and the ADF motor 18c causes the driving roller 18a to apply the force to the imaging target medium P in the conveying direction. For setting the imaging target medium P that is captured as the image by the imaging unit 16, a sheet feeding unit (not shown in the drawings) is disposed at an upstream side in the conveying direction of the imaging target medium P with respect to the imaging unit 16. However, for ejecting from the image reader 10, the imaging target medium P that is captured as the image by the imaging unit 16, a sheet ejecting unit (not shown in the drawings) is disposed at a downstream side in the conveying direction of the imaging target medium P with respect to the imaging unit 16. For example, upon pressing a scan switch 29, the ADF motor 18c drives and the driving roller 18a applies the force to the imaging target medium P, which is set in the sheet feeding unit and is inserted between the driving roller 18a and the driven roller 18b, in the conveying direction. Consequently, the imaging target medium P is conveyed along the conveying direction and is ejected to the sheet ejecting unit.

In the image reader 10, when the imaging target medium P is conveyed by the conveying unit 18, the RLED 12a, the GLED 12b, the BLED 12c, and the UVLED 14a sequentially lights-up one by one. To be specific, in the present embodiment, when the imaging target medium P is conveyed by the conveying unit 18, power is sequentially supplied to each RLED 12a, the GLED 12b, the BLED 12c, and the UVLED 14a from the control board 20 (while switching a supply destination of power such that the supply destination of power is one of the LEDs 12a, 12b, 12c, and 14a), and each RLED 12a, the GLED 12b, the BLED 12c, and the UVLED 14a sequentially lights-up one by one. In the image reader 10, when the imaging target medium P is not placed on the image-reading supporting plate 26, all the LEDs such as the RLED 12*a*, the GLED 12*b*, and the BLED 12*c* of the first light source 12 light-up. Due to this, a white light composed of all the LEDs can irradiate the white reference plate 21 via the image-reading supporting plate 26.

The control board 20 that is the image-data generating unit generates by using the image-data generating unit 20*a*, at least any one of first image data that corresponds to the imaging target medium P when the first light source 12 irradiates the imaging target medium P with only the first light and second image data that corresponds to the imaging target medium P when the second light source 14 irradiates the imaging target medium P with only the second light.

Based on the reflected light, of the wavelength inside the visible spectrum, corresponding to the first light that is reflected on the imaging target medium P when the first light source 12 irradiates the imaging target medium P with only the first light, the image-data generating unit 20*a* of the control board 20 generates a visible light data group corresponding to the portion of the imaging target medium P that is captured as the image by the imaging unit 16. The image-data generating unit 20*a* collects multiple visible light data group generated till the end of the conveyance after the conveyance of the imaging target medium P is started by the conveying unit 18 and generates the first image data. Furthermore, based on the fluorescence, of the wavelength inside the visible spectrum, corresponding to the second light that is reflected on the imaging target medium P when the second light source 14 irradiates the imaging target medium P with only the second light, the image-data generating unit 20*a* of the control board 20 generates a visible light external data group corresponding to the portion of the imaging target medium P that is captured as the image by the imaging unit 16. The image-data generating unit 20*a* collects multiple visible light external data group generated till the end of the conveyance after the conveyance of the imaging target medium P is started by the conveying unit 18 and generates the second image data.

To be specific, at a lighting-up switchover timing of the RLED 12*a*, the GLED 12*b*, the BLED 12*c*, and the UVLED 14*a*, the image-data generating unit 20*a* of the control board 20 determines whether a line data output from the image sensor 16*a* is R line data corresponding to the R light, G line data corresponding to the G light, B line data corresponding to the B light, or UV line data corresponding to the ultraviolet light. The image-data generating unit 20*a* repeatedly and multiply generates the visible light data group, which is formed of the R line data corresponding to the R light that is picked up as the image by the image sensor 16*a* that is the line sensor when the RLED 12*a* is lit-up, the G line data corresponding to the G light that is picked up as the image by the image sensor 16*a* when the GLED 12*b* is lit-up, and the B line data corresponding to the B light that is picked up as the image by the image sensor 16*a* when the BLED 12*c* is lit-up, till the end of the conveyance after the conveyance of the imaging target medium P is started by the conveying unit 18. Furthermore, the image-data generating unit 20*a* repeatedly and multiply generates the visible light external data group that is formed of the UV line data corresponding to the ultraviolet light that is captured as the image by the image sensor 16*a* when the UVLED 14*a* is lit-up.

The image-data generating unit 20*a* of the control board 20 generates the visible light data group and the visible light external data group by parallel processes executed in synchronization with the lighting-up switchover timings of the first light source 12 of the RLED 12*a*, the GLED 12*b*, and the BLED 12*c* and the second light source 14 of the UVLED 14*a*. In other words, the image-data generating unit 20*a* of the control board 20 generates the visible light data group and the visible light external data group by the parallel processes executed in synchronization with the switchover timing when the image of the reflected light of the first light is picked up and an image of the fluorescence of the second light is picked up by the image sensor 16*a* that is the imaging unit 16. Thus, the image-data generating unit 20*a* of the control board 20 generates the first image data by collecting the multiple visible light data group and also generates the second image data by collecting the multiple visible light external data group.

The white reference plate 21 is used for updating first white reference data that is the base for correcting the first image data. The white reference plate 21 is disposed separately from a conveyance path (an inclined face of a steel case 30 including main components of the image reader 10) of the imaging target medium P such that the white reference plate 21 is facing the image-reading supporting plate 26. A plate that is formed of a resin in which a fluorescent pigment is mixed or a plate of a white light irradiated surface coated by a white fluorescent paint can be used as the white reference plate 21. When all the LEDs such as the RLED 12*a*, the GLED 12*b*, and the BLED 12*c* of the first light source 12 are lit-up when the imaging target medium P is not placed on the image-reading supporting plate 26, in other words, when the first light source 12 emits the white light, the white reference plate 21 reflects to the image sensor 16*a* that is the imaging unit 16, the light, of the wavelength inside the visible spectrum, corresponding to the white light. Furthermore, at the time of updating second white reference data that is the base for correcting the second image data, the white reference plate 21 reflects to the image sensor 16*a* that is the imaging unit 16, the fluorescence, of the wavelength inside the visible spectrum, corresponding to the ultraviolet light from the UVLED 14*a* due to lighting-up of the UVLED 14*a* that is the second light source 14. The white reference plate 21 curbs isolation or rise (separation) of the imaging target medium P from the image-reading supporting plate 26 at the time of conveying the imaging target medium P.

The first white reference data and the second white reference data are previously stored in the image-data generating unit 20*a* of the control board 20 for correcting the generated first image data and the second image data. Thus, the white reference plate 21 is used for updating the first white reference data and the second white reference data that are previously stored in the image reader 10.

Furthermore, a sheet, an overhead projector (OHP) sheet, etc. are used as the imaging target medium P.

Operations of the image reader 10 according to the first embodiment of the present invention are explained below.

Figure 3:
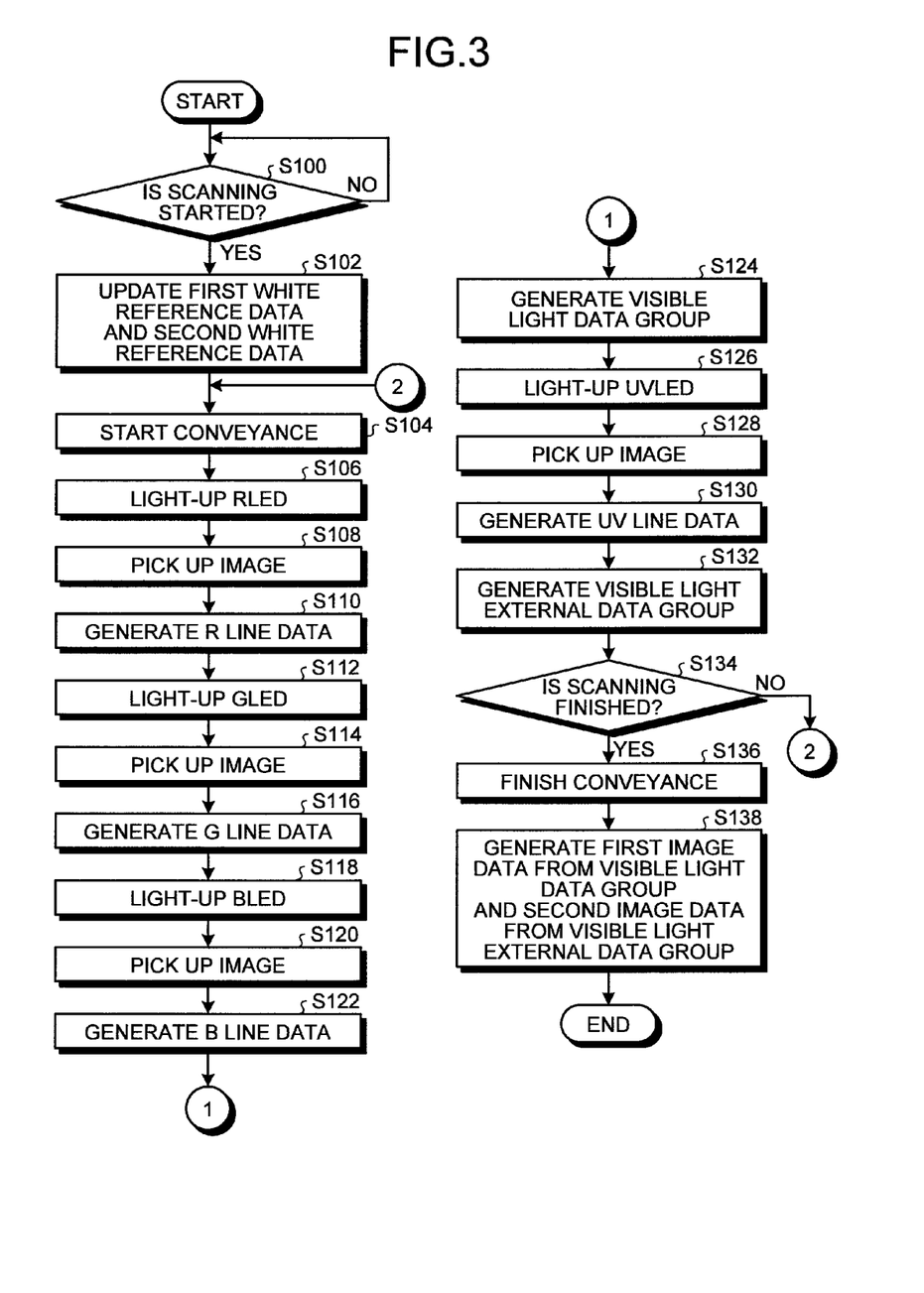
FIG. 3 is a flowchart for explaining a sequence of operations performed by the image reader according to the first embodiment.

FIG. 3 is a flowchart for explaining a sequence of the operations performed by the image reader 10.

Upon turning on power of the image reader 10, the image reader 10 proceeds to Step S100 and the imaging target medium P is set in the sheet feeding unit (not shown) of the image reader 10. At Step S100, it is determined whether the scan switch 29 is pressed. Only upon determining at Step S100 that the scan switch 29 is pressed, it is determined that scanning of the imaging target medium P is started and the image reader 10 proceeds to Step S102.

If it is determined that the scanning of the imaging target medium P is started (Yes at Step S100) and the image reader 10 proceeds to Step S102, because the RLED 12*a*, the GLED 12*b*, and the BLED 12*c* of the first light source 12 are simultaneously lit-up when the imaging target medium P is not conveyed by the conveying unit 18, in other words, when the imaging target medium P is not facing the imaging unit 16, the white light irradiating the white reference plate 21. If the white light irradiating the white reference plate 21 due to simultaneous lighting-up of the RLED 12a, GLED 12b, and the BLED 12c, the light, of the wavelength inside the visible spectrum, corresponding to the white light is reflected by the white reference plate 21 and the image of the reflected light is picked up by the image sensor 16a that is the imaging unit 16. Consequently, a first updated output value corresponding to the white reference plate 21 irradiated by the white light, is transmitted to the image-data generating unit 20a of the control board 20 from the image sensor 16a. The image-data generating unit 20a of the control board 20 updates first updated line data and based on the first updated line data, updates the first white reference data previously stored in the image-data generating unit 20a. Furthermore, upon finishing updation of the first white reference data, the ultraviolet light irradiating the white reference plate 21 due to lighting-up of the UVLED 14a of the second light source 14. If the ultraviolet light irradiates the white reference plate 21 due to lighting-up of the UVLED 14a of the second light source 14, the light, of the wavelength inside the visible spectrum, corresponding to the ultraviolet light causes fluorescence due to the white reference plate 21 and the image of the light is picked up by the image sensor 16a that is the imaging unit 16. Consequently, the second updated output value corresponding to the white reference plate 21 irradiated by the ultraviolet light is transmitted to the image-data generating unit 20a of the control board 20 from the image sensor 16a. The image-data generating unit 20a of the control board 20 updates the second updated line data and based on the second updated line data, updates the second white reference data that is previously stored in the image-data generating unit 20a. Thus, the white reference plate 21 can be used for updating the first white reference data that is the base for correcting the first image data. If the ultraviolet light irradiates due to lighting-up of the UVLED 14a of the second light source 14, the white reference plate 21 can also be used for updating the second white reference data that is the base for correcting the second image data. By reversing the sequence of irradiation of the white light due to simultaneous lighting-up of the RLED 12a, GLED 12b, and the BLED 12c of the first light source 12 and irradiation of the ultraviolet light due to lighting-up of the UVLED 14a of the second light source 14, the first white reference data can be updated after the second white reference data is updated. Upon finishing updation of the first white reference data and the second white reference data, the image reader 10 proceeds to Step S104.

At Step S104, the ADF motor 18c of the conveying unit 18 drives and the driving roller 18a rotates in an arrow direction shown in FIG. 1. Due to this, the imaging target medium P is sandwiched between the driving roller 18a and the driven roller 18b and is conveyed to the image sensor 16a of the imaging unit 16 along the conveying direction (vertical scanning direction) of the imaging target medium P (conveying of the imaging target medium P started). Upon starting conveying of the imaging target medium P, the image reader 10 proceeds to Step S106.

At Step S106, when the imaging target medium P is conveyed to the image sensor 16a of the imaging unit 16 by the driving roller 18a and the driven roller 18b of the conveying unit 18, the RLED 12a lights-up. Upon lighting-up the RLED 12a, the image reader 10 proceeds to Step S108.

At Step S108, the image sensor 16a picks up the image of the reflected light, of the wavelength inside the visible spectrum, corresponding to the R light that is reflected on the imaging target medium P. Upon the image sensor 16a picking up the image of the reflected light, of the wavelength inside the visible spectrum, corresponding to the R light, the image reader 10 proceeds to Step S110.

At Step S110, the R output value that is based on the reflected light, of the wavelength inside the visible spectrum, corresponding to the R light, is output from the image sensor 16a and based on the R output value, the R line data is generated by the image-data generating unit 20a of the control board 20. Upon the image-data generating unit 20a of the control board 20 generating the R line data, the image reader 10 proceeds to Step S112.

At Step S112, the RLED 12a turns off and the GLED 12b lights-up. Upon lighting-up the GLED 12b, the image reader 10 proceeds to Step S114.

At Step S114, the image sensor 16a picks up the image of the reflected light, of the wavelength inside the visible spectrum, corresponding to the G light that is reflected on the imaging target medium P. Upon the image sensor 16a picking up the image of the reflected light, of the wavelength inside the visible spectrum, corresponding to the G light, the image reader 10 proceeds to Step S116.

At Step S116, the G output value that is based on the reflected light, of the wavelength inside the visible spectrum, corresponding to the G light, is output from the image sensor 16a and based on the G output value, the G line data is generated by the image-data generating unit 20a of the control board 20. Upon the image-data generating unit 20a of the control board 20 generating the G line data, the image reader 10 proceeds to Step S118.

At Step S118, the GLED 12b turns off and the BLED 12c lights-up. Upon lighting-up the BLED 12c, the image reader 10 proceeds to Step S120.

At Step S120, the image sensor 16a picks up the image of the reflected light, of the wavelength inside the visible spectrum, corresponding to the B light reflected on the imaging target medium P. Upon the image sensor 16a picking up the image of the reflected light, of the wavelength inside the visible spectrum, corresponding to the B light, the image reader 10 proceeds to Step S122.

At Step S122, the B output value that is based on the reflected light, of the wavelength inside the visible spectrum, corresponding to the B light, is output from the image sensor 16a and based on the B output value, the B line data is generated by the image-data generating unit 20a of the control board 20. Upon the image-data generating unit 20a of the control board 20 generating the B line data, the image reader 10 proceeds to Step S124.

At Step S124, the BLED 12c turns off and the image-data generating unit 20a of the control board 20 generates the visible light data group formed of the R line data, the G line data, and the B line data. Upon the image-data generating unit 20a of the control board 20 generating the visible light data group, the image reader 10 proceeds to Step S126.

At Step S126, the UVLED 14a lights-up. Upon lighting-up the UVLED 14a, the image reader 10 proceeds to Step S128.

At Step S128, the image sensor 16a picks up the image of the fluorescence, of the wavelength inside the visible spectrum, corresponding to the ultraviolet light reflected on the imaging target medium P. For example, when the imaging target medium P is an original on which characters are recorded and markings are made by a fluorescent pen and if the ultraviolet light irradiates portions marked with the fluorescent pen, the portions marked with the fluorescent pen cause fluorescence due to the light, of the wavelength inside the visible spectrum, that responds to the markings of the fluorescent pen. Upon the image sensor 16a picking up the image of the fluorescence, of the wavelength inside the visible spectrum, corresponding to the ultraviolet light, the image reader 10 proceeds to Step S130.

At Step S130, the UV fluorescence output value that is based on the fluorescence, of the wavelength inside the visible spectrum, corresponding to the ultraviolet light is output from the image sensor 16a and based on the UV fluorescence output value, the UV line data is generated by the image-data generating unit 20a of the control board 20. Upon the image-data generating unit 20a of the control board 20 generating the UV line data, the image reader 10 proceeds to Step S132.

At Step S132, the UVLED 14a is turned off and the visible light external data group formed of the UV line data is generated. Upon generating the visible light external data group, the image reader 10 proceeds to Step S134.

At Step S134, it is determined whether scanning of the imaging target medium P is finished. Whether scanning of the imaging target medium P is finished can be determined based on an output from a detecting sensor that is arranged for the imaging target medium P in a vicinity of the image-reading supporting plate 26. Upon the detecting sensor not detecting the imaging target medium P, it is determined that scanning of the imaging target medium P is finished. At Step S134, upon determining that scanning of the imaging target medium P is finished, the image reader 10 proceeds to Step S136. Upon determining that scanning of the imaging target medium P is not finished, the operation is repeated by returning to Step S104.

Upon determining that scanning of the imaging target medium P is finished and the image reader 10 proceeding to Step S136, the ADF motor 18c of the conveying unit 18 rotates, for example, by a predetermined amount and transmits the imaging target medium P to the ejecting unit (not shown) of the image reader 10. The ADF motor 18c stops and rotation of the driving roller 18a also stops. Thus, upon finishing conveyance of the imaging target medium P, the image reader 10 proceeds to Step S138.

At Step S138, the image-data generating unit 20a of the control board 20 collects the multiple visible light data group generated at Step S124 and generates the first image data corresponding to the imaging target medium P. The image-data generating unit 20a of the control board 20 also collects the multiple visible light external data group generated at Step S132 and generates the second image data corresponding to the imaging target medium P. Thus, upon generating the first image data and the second image data, an image capturing process of the imaging target medium P ends.

As mentioned earlier, if the first light source 12 and the second light source 14 are alternately lit-up when the imaging target medium P is conveyed to the image sensor 16a of the imaging unit 16 by the driving roller 18a and the driven roller 18b, the visible light data group that is based on the reflected light, of the wavelength inside the visible spectrum, of the first light and the visible light external data group that is based on the fluorescence, of the wavelength inside the visible spectrum, of the second light are alternately generated. Among the alternately generated multiple visible light data group and the multiple visible light external data group, by collecting the multiple visible light data group, the first image data corresponding to the imaging target medium P is generated and by collecting the multiple visible light external data group, the second image data corresponding to the imaging target medium P is generated. To be specific, when the imaging target medium P is conveyed to the image sensor 16a of the imaging unit 16 by the driving roller 18a and the driven roller 18b of the conveying unit 18, the RLED 12a, the GLED 12b, and the BLED 12c of the first light source 12 and the UVLED 14a of the second light source 14 sequentially lights-up one by one, thereby alternately generating the visible light data group that is based on the reflected light, of the wavelength inside the visible spectrum, of the R light, the G light, and the B light that is the first light and the visible light external data group that is based on the fluorescence, of the wavelength inside the visible spectrum, of the ultraviolet light that is the second light. Consequently, by collecting the multiple visible light data group, the first image data that is based on the R light, the G light, and the B light that is the first light, and that corresponds to the imaging target medium P captured as the image by the image sensor 16a of the imaging unit 16 is generated. Furthermore, by collecting the multiple visible light external data group, the second image data that is based on the ultraviolet light that is the second light, and that corresponds to the imaging target medium P captured as the image by the image sensor 16a of the imaging unit 16 is generated. Thus, for example, when the imaging target medium P is the original on which the characters are recorded and markings are made by the fluorescent pen, the first image data and the second image data can be generated. The first image data is based on the captured image of the entire original corresponding to the white light and the second image data is based on the captured image of the entire original, corresponding to the ultraviolet light, on which the portions marked with the fluorescent pen are highlighted.

Thus, the first image data and the second image data corresponding to the imaging target medium P can be generated by scanning the imaging target medium P once. In other words, by scanning the imaging target medium P once, the picked-up image data that is based on the R light, the G light, and the B light that is the light of the wavelength inside the visible spectrum and the picked-up image data that is based on the ultraviolet light that is the light of the wavelength outside the visible spectrum can be generated from the imaging target medium P.

In the image reader 10, the image sensor 16a that is the single imaging unit 16 picks up the image of the reflected light of the R light, the G light, and the B light that is the first light and also picks up the image of the fluorescence of the ultraviolet light that is the second light. Thus, in the image reader 10, arranging an imaging unit for picking up the image of the reflected light of the R light, the G light, and the B light that is the first light and an imaging unit for picking up the image of the fluorescence of the ultraviolet light that is the second light is not necessary. Thus, the image reader 10 can be miniaturized.

In the image reader 10, each LED such as the RLED 12a, the GLED 12b, the BLED 12c, and the UVLED 14a sequentially lights-up one by one, thus sequentially generating the R line data, the G line data, the B line data, and the UV line data one by one. Consequently, line data corresponding to four LED colors is successively generated during each cycle of lighting-up of the RLED 12a, GLED 12b, BLED 12c, and the UVLED 14a. The four-color successive line data represents the R line data, the G line data, and the B line data forming the visible light data group and the UV line data forming an ultraviolet light data group that is the visible light external data group. In other words, the line data corresponding to the successive three colors such as the R line data, the G line data, and the B line data, forming the visible light data group, that sandwich the UV line data forming the ultraviolet light data group is repeatedly generated. Thus, the percentage of the UV line data, forming the ultraviolet line data group, in the line data generated during each cycle of lighting-up of the RLED 12a, the GLED 12b, and the BLED 12c is minimized. Due to this, a reproduction accuracy of the first image data generated by collecting the multiple visible light data group with respect to the imaging target medium P can be enhanced compared to when the percentage of the R line data, the G line data, and the B line data forming the visible light data group is similar to the percentage of the UV line data forming the ultraviolet data group among the line data generated during each cycle of lighting-up of the RLED 12a, the GLED 12b, the BLED 12c, and the UVLED 14.

In the image reader 10, the image sensor 16a that is the line sensor and that is currently used for picking up the image of the reflected light of the white light can be used for picking up the image of the fluorescence of the ultraviolet light. Thus, only by adding the light source for the ultraviolet light in the imaging unit including the light source for the white light, the first image data and the second image data can be generated by scanning once without increasing a number of components. Furthermore, as mentioned earlier, the RLED 12a, the GLED 12b, and the BLED 12c of the first light source 12 and the UVLED 14a of the second light source 14 can be included in a single unit. Thus, increment in the number of components can be curbed compared to using two units including the light source and the imaging unit.

In the image reader 10 according to the first embodiment, when the imaging unit 16 captures the image of the imaging target medium P, the second light source 14 lights-up after the first light source 12 is lit-up. However, the present invention is not to be thus limited. The first light source 12 can be lit-up after the second light source 14 is lit-up.

In the image reader 10 according to the first embodiment, the image sensor 16a of the imaging unit 16 captures the image of the imaging target medium P. When the first light source 12 lights-up in the sequence of the RLED 12a, the GLED 12b, and the BLED 12c, the R light, the G light, and the B light irradiate the imaging target medium P and the R output value, the G output value, and the B output value are output from the image sensor 16a. However, the present invention is not to be thus limited. If the R output value, the G output value, and the B output value are output from the image sensor 16a, the sequence of lighting-up of the RLED 12a, the GLED 12b, or the BLED 12c can be suitably changed.

In the first embodiment, the image reader 10 sets the timing for collecting the multiple visible light data group and the multiple visible light external data group by the image-data generating unit 20a of the control board 20 after the conveyance of the imaging target medium P by the conveying unit 18 is finished. However, the present invention is not to be thus limited. In the present invention, whenever a number of the visible light data group and the visible light external data group increases, the multiple visible light data group or visible light external data group is collected. When the scanning of the imaging target medium P is finished, the first image data can be generated from the collected multiple visible light data group and the second image data can be generated from the collected multiple visible light external data group.

Figure 4:
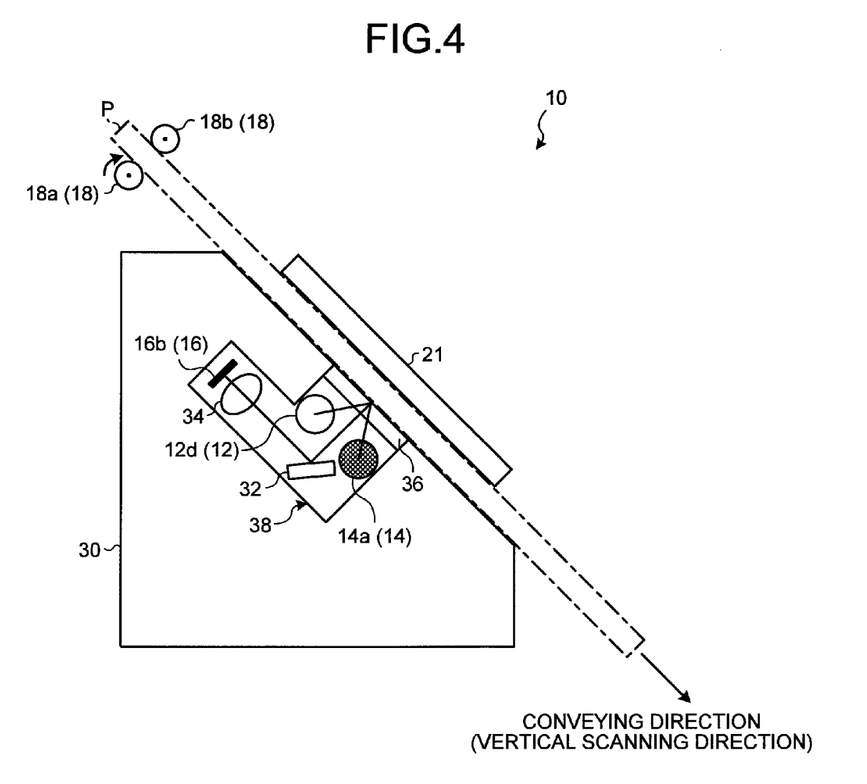
FIG. 4 is a schematic diagram for explaining an overview of an image reader according to a second embodiment of the present invention.
Figure 5:
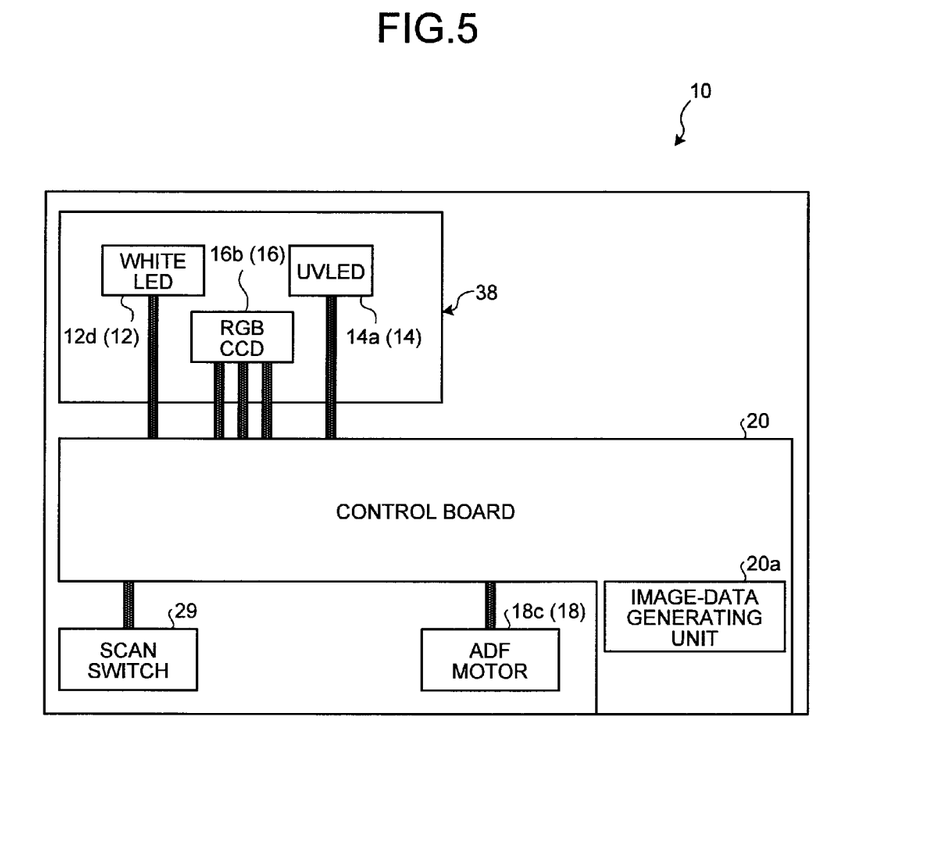
FIG. 5 is a block diagram of the image reader according to the second embodiment.

The image reader 10 according to a second embodiment of the present invention is explained below. FIG. 4 is a schematic diagram for explaining an overview of the image reader 10 according to the second embodiment. FIG. 5 is a block diagram of the image reader 10. In the image reader 10 according to the second embodiment, same reference numerals are assigned to components similar to the components of the image reader 10 according to the first embodiment and a redundant explanation is omitted.

In the second embodiment, the first light source 12 is formed of a white LED 12d that emits the white light and the second light source 14 is formed of the UVLED 14a that emits the ultraviolet light. The white LED 12d and the UVLED 14a are respectively connected to the control board 20. Power is supplied from the control board 20 to light-up the white LED 12d and the UVLED 14a. To be specific, upon supplying power to the white LED 12d and the UVLED 14a from the control board 20, the white LED 12d irradiates the imaging target medium P, the white light that is the first light of the wavelength inside the visible spectrum and the UVLED 14a irradiates the imaging target medium P, the ultraviolet light that is the second light of the wavelength inside the visible spectrum. In the second embodiment, the white light is formed of lights of various wavelengths that range between approximately 380 nm and approximately 780 nm. The wavelength of the white light emitted from the white LED 12d ranges between 380 nm and 780 nm. Furthermore, the ultraviolet light of the wavelength within approximately 200 nm to approximately 380 nm is desirable. In the second embodiment, the wavelength of the ultraviolet light emitted from the UVLED 14a is, for example, considered as 360 nm.

In the second embodiment, an image sensor 16b that is a three-line sensor is used as the imaging unit 16. The image sensor 16b is a charge coupled device (CCD) and is formed of an R line sensor that responds only to the R light, a G line sensor that responds only to the G light, and a B line sensor that responds only to the B light. The R line sensor, the G line sensor, and the B line sensor are respectively formed of a plurality of imaging elements arranged in a single row in a main scanning direction.

The image sensor 16b forms an imaging unit 38 along with the white LED 12d, the UVLED 14a, a mirror 32 that reflects the reflected light or the fluorescence from the imaging target medium P to the image sensor 16b, a lens 34 that converges the reflected light from the mirror 32 such that the image sensor 16b can pick up the image, and an image-reading supporting plate 36 for capturing the image of the imaging target medium P based on the white light from the white LED 12d or the ultraviolet light from the UVLED 14a. When the white LED 12d or the UVLED 14a lights-up, the image sensor 16b picks up via the mirror 32 and the lens 34, the image of the reflected light of the white light or the fluorescence of the ultraviolet light irradiating a portion, from the imaging target medium P, facing the image-reading supporting plate 36.

Thus, the image sensor 16b outputs to the image-data generating unit 20a of the control board 20, the R output value of each imaging element of the R line sensor corresponding to the R light, the G output value of each imaging element of the G line sensor corresponding to the G light, and the B output value of each imaging element of the B line sensor corresponding to the B light on the portion of the imaging target medium P that is captured as the image upon lighting-up of the white LED 12d. The image sensor 16b also outputs to the image-data generating unit 20a of the control board 20, the R output value of each imaging element of the R line sensor corresponding to the ultraviolet light, the G output value of each imaging element of the G line sensor corresponding to the ultraviolet light, and the B output value of each imaging element of the B line sensor corresponding to the ultraviolet light on the portion of the imaging target medium P that is captured as the image upon lighting-up of the UVLED 14a.

In the second embodiment, when the white LED 12d lights-up, the control board 20 that is the image-data generating unit generates the R line data, from the R output value, that is captured as an image by the R line sensor, the G line data, from the G output value, that is captured as an image by the G line sensor, and the B line data, from the B output value, that is captured as an image by the B line sensor. The visible light data group that is formed of the generated R line data, the G line data, and the B line data is repeatedly and multiply generated till the end of the conveyance after the conveyance of the imaging target medium P is started by the conveying unit 18. When the UVLED 14a lights-up, the control board 20 that is the image-data generating unit generates the R line data, from the R output value, that is captured as the image by the R line sensor, the G line data, from the G output value, that is captured as the image by the G line sensor, and the B line data, from the B output value, that is captured as the image by the B line sensor. The visible light external data group that is formed of the ultraviolet light line data that is formed of the generated R line data, the G line data, and the B line data is repeatedly and multiply generated till the end of the conveyance after the conveyance of the imaging target medium P is started by the conveying unit 18.

To be specific, the control board 20 that is the image-data generating unit generates by the image-data generating unit 20a till the end of the conveyance after the conveyance of the imaging target medium P is started by the conveying unit 18, the visible light data group and the visible light external data group by parallel processes executed in synchronization with the lighting-up switchover timings of the white LED 12d of the first light source 12 and the UVLED 14a of the second light source 14. In other words, the control board 20 that is the image-data generating unit generates by the image-data generating unit 20a till the end of the conveyance after the conveyance of the imaging target medium P is started by the conveying unit 18, the visible light data group and the visible light external data group by parallel processes executed in synchronization with the switchover timing when the image of the reflected light of the first light is picked up and the image of the fluorescence of the second light is picked up by the image sensor 16b that is the imaging unit 16. Thus, the image-data generating unit 20a of the control board 20 generates by collecting the multiple visible light data group, the first image data and also generates by collecting the multiple visible light external data group, the second image data.

In the image reader 10 according to the second embodiment, when the imaging target medium P is conveyed by the conveying unit 18, the white LED 12d that is the first light source 12 and the UVLED 14a that is the second light source 14 alternately light-up. To be specific, in the image reader 10, when the imaging target medium P is conveyed by the conveying unit 18, power is alternately supplied by the control board 20 to the white LED 12d and the UVLED 14a, thus alternately lighting-up the white LED 12d and the UVLED 14a. Furthermore, when the imaging target medium P is not placed on the image-reading supporting plate 36, by lighting-up the white LED 12d of the first light source 12, the white light can irradiate the image-reading supporting plate 36.

At the lighting-up switchover timing of the white LED 12d and the UVLED 14a, the image-data generating unit 20a of the control board 20 determines whether the value output from the image sensor 16a is the R output value, the G output value, and the B output value upon lighting-up of the white LED 12d or the R output value, the G output value, and the B output value upon lighting-up of the UVLED 14a.

Similarly as in the first embodiment, the white reference plate 21 is used for updating the first white reference data and the second reference data. In the second embodiment, the white reference plate 21 is disposed by facing the image-reading supporting plate 36. The white reference plate 21 curbs isolation or rise (separation) of the imaging target medium P from the image-reading supporting plate 36 at the time of conveying the imaging target medium P.

Operations performed by the image reader 10 according to the second embodiment of the present invention are explained below.

Figure 6:
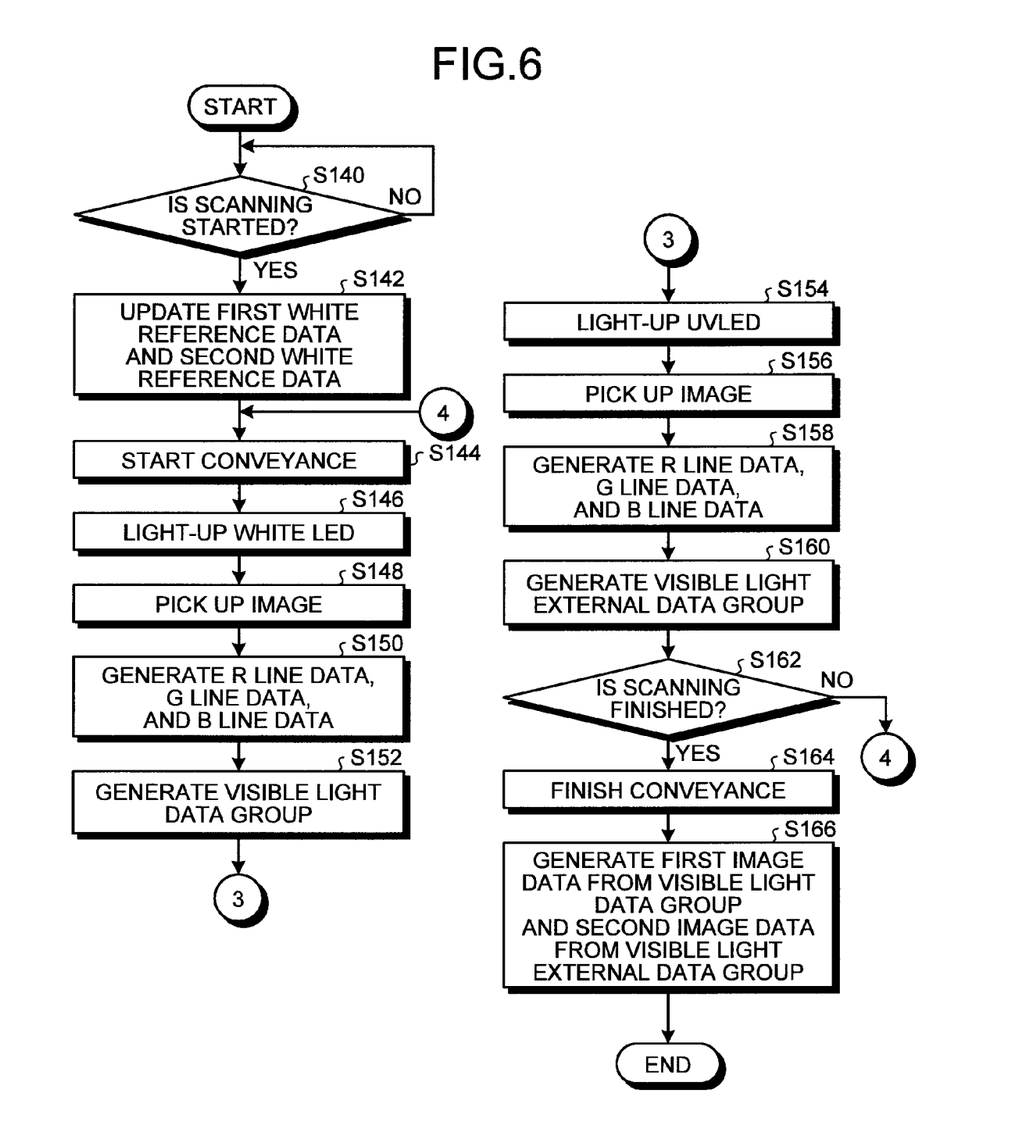
FIG. 6 is a flowchart for explaining a sequence of operations performed by the image reader according to the second embodiment.

FIG. 6 is a flowchart for explaining a sequence of operations performed by the image reader 10.

Upon turning on power of the image reader 10, the image reader 10 proceeds to Step S140. Similarly as in the first embodiment, the imaging target medium P is set in the sheet feeding unit (not shown) of the image reader 10. At Step S140, it is determined whether the scan switch 29 is pressed. Only upon determining at Step S140 that the scan switch 29 is pressed, the image reader 10 proceeds to Step S142.

Upon determining that the scan switch 29 is pressed (Yes at Step S140) and the image reader 10 proceeding to Step S142, when the imaging target medium P is not conveyed by the conveying unit 18. In other words, when the imaging target medium P is not facing the imaging unit 16, the white LED 12d of the first light source 12 is lit-up and the white light irradiates the white reference plate 21. If the white light irradiates the white reference plate 21 due to lighting-up of the white LED 12d of the first light source 12, the light, of the wavelength inside the visible spectrum, corresponding to the white light is reflected by the white reference plate 21 and the image of the light is picked up by the image sensor 16b that is the imaging unit 16. Thus, similarly as in the first embodiment, the first white reference data previously stored in the image-data generating unit 20a of the control board 20 is updated. Upon finishing updation of the first white reference data, the ultraviolet light irradiates the white reference plate 21 due to lighting-up of the UVLED 14a of the second light source. Similarly as in the first embodiment, upon irradiating the white reference plate 21 with the ultraviolet light due to lighting-up of the UVLED 14a of the second light source 14, the light, of the wavelength inside the visible spectrum, corresponding to the ultraviolet light causes fluorescence due to the white reference plate 21 and the image of the light is picked up by the image sensor 16b that is the imaging unit 16. Thus, the second white reference data that is previously stored in the image-data generating unit 20a of the control board 20 is updated. By reversing the sequence of irradiation of the white light due to lighting-up of the white LED 12d that is the first light source 12 and irradiation of the ultraviolet light due to lighting-up of the UVLED 14a that is the second light source 14, the first white reference data can be updated after the second white reference data is updated. Upon finishing updation of the first white reference data and the second white reference data, the image reader 10 proceeds to Step S144.

At Step S144, similarly as in the first embodiment, the ADF motor 18c of the conveying unit 18 drives and the driving roller 18a rotates in an arrow direction shown in FIG. 4. Due to this, the imaging target medium P is sandwiched between the driving roller 18a and the driven roller 18b and is conveyed to the image sensor 16b of the imaging unit 16 along the conveying direction (vertical scanning direction) of the imaging target medium P (the conveyance of the imaging target medium P is started). Upon starting the conveyance of the imaging target medium P, the image reader 10 proceeds to Step S146.

At Step S146, when the imaging target medium P is conveyed to the image sensor 16b of the imaging unit 16 by the driving roller 18a and the driven roller 18b of the conveying unit 18, the white LED 12d lights-up. Upon lighting-up the white LED 12d, the image reader 10 proceeds to Step S148.

At Step S148, the image sensor 16b picks up the image of the reflected light, of the wavelength inside the visible spectrum, corresponding to the white light that is reflected on the imaging target medium P. Upon the image sensor 16b picking up the image of the reflected light, of the wavelength inside the visible spectrum, corresponding to the white light, the image reader 10 proceeds to Step S150.

At Step S150, the R output value, the G output value, and the B output value that are based on the reflected light, of the wavelength inside the visible spectrum, corresponding to the white light, are simultaneously output from the image sensor 16b and the image-data generating unit 20a of the control board 20 generates the R line data, the G line data, and the B line data. Upon the image-data generating unit 20a of the control board 20 generating the R line data, the G line data, and the B line data, the image reader 10 proceeds to Step S152.

At Step S152, similarly as in the first embodiment, the white LED 12d is turned off and the visible light data group formed of the R line data, the G line data, and the B line data is generated. Upon generating the visible light data group, the image reader 10 proceeds to Step S154.

At Step S154, similarly as in the first embodiment, the UVLED 14a lights-up. Upon lighting-up the UVLED 14a, the image reader 10 proceeds to Step S156.

At Step S156, similarly as in the first embodiment, the image sensor 16b picks up the image of the fluorescence, of the wavelength inside the visible spectrum, corresponding to the ultraviolet light that is reflected on the imaging target medium P. Upon the image sensor 16b picking up the image of the fluorescence, of the wavelength inside the visible spectrum, corresponding to the ultraviolet light, the image reader 10 proceeds to Step S158.

At Step S158, the R output value, the G output value, and the B output value based on the fluorescence, of the wavelength inside the visible spectrum, corresponding to the ultraviolet light are output from the image sensor 16b. Thus, the image-data generating unit 20a of the control board 20 generates the R line data, the G line data, and the B line data. Upon the image-data generating unit 20a of the control board 20 generating the R line data, the G line data, and the B line data, the image reader 10 proceeds to Step S160.

At Step S160, the UVLED 14a turns off and the image-data generating unit 20a of the control board 20 generates the visible light external data group formed of the R line data, the G line data, and the B line data corresponding to the ultraviolet light. Upon generating the visible light external data group, the image reader 10 proceeds to Step S162.

At Step S162, similarly as in the first embodiment, it is determined whether scanning of the imaging target medium P is finished. Upon determining at Step S162 that scanning of the imaging target medium P is finished, the image reader 10 proceeds to Step S164. Upon determining that scanning of the imaging target medium P is not finished, by returning to Step S144, the operation is repeated.

Upon determining that scanning of the imaging target medium P is finished and the image reader 10 proceeding to Step S164, the ADF motor 18c of the conveying unit 18 rotates, for example, by the predetermined amount and transmits the imaging target medium P to the ejecting unit (not shown) of the image reader 10. Similarly as in the first embodiment, the ADF motor 18c stops and rotation of the driving roller 18a also stops. Thus, upon finishing conveyance of the imaging target medium P, the image reader 10 proceeds to Step S166.

At Step S166, the image-data generating unit 20a of the control board 20 collects the multiple visible light data group generated at Step S152 and generates the first image data corresponding to the imaging target medium P. The image-data generating unit 20a of the control board 20 also collects the multiple visible light external data group generated at Step S160 and generates the second image data corresponding to the imaging target medium P. Thus, upon generating the first image data and the second image data, the imaging process of the imaging target medium P ends.

As mentioned earlier, if the white LED 12d of the first light source 12 and the UVLED 14a of the second light source 14 are alternately lit-up when the imaging target medium P is conveyed to the image sensor 16b of the imaging unit 16 by the driving roller 18a and the driven roller 18b, the visible light data group that is based on the reflected light, of the wavelength inside the visible spectrum, of the white light that is the first light and the visible light external data group that is based on the fluorescence, of the wavelength inside the visible spectrum, of the ultraviolet light that is the second light are alternately generated. Consequently, by collecting the multiple visible light data group, the first image data, based on the white light of the first light, of the imaging target medium P that is captured as the image by the image sensor 16b of the imaging unit 16 is generated. Furthermore, by collecting the multiple visible light external data group, the second image data, based on the ultraviolet light of the second light, of the imaging target medium P that is captured as the image by the image sensor 16b of the imaging unit 16 is generated. Thus, similarly as in the first embodiment, when the imaging target medium P is the original on which the characters are recorded and markings are made by the fluorescent pen, the first image data and the second image data can be generated. The first image data is based on the captured image of the entire original that is corresponding to the white light and the second image data is based on the captured image of the entire document, corresponding to the ultraviolet light, on which the portions marked with the fluorescent pen are highlighted.

Thus, similarly as in the first embodiment, the first image data and the second image data can be generated by scanning the imaging target medium P once. In other words, by scanning the imaging target medium P once, the picked-up image data that is based on the white light that is the light of the wavelength inside the visible spectrum and the picked-up image data that is based on the ultraviolet light that is the light of the wavelength outside the visible spectrum can be generated from the imaging target medium P.

In the image reader 10, the image sensor 16b that is the single imaging unit 16 picks up the image of the reflected light of the white light that is the first light and also picks up the image of the fluorescence of the ultraviolet light that is the second light. Thus, in the image reader 10, arranging an imaging unit for picking up the image of the reflected light of the white light that is the first light and the imaging unit for picking up image of the fluorescence of the ultraviolet light that is the second light is not necessary. Thus, the image reader 10 can be miniaturized.

In the image reader 10, the ultraviolet light data group that is the visible light external data group includes the R line data, the G line data, and the B line data. Thus, because the ultraviolet light data group becomes full color line data, the second image data generated by collecting the multiple visible light external data group can be also defined as the full color image data.

Further, the image sensor 16b that is the three-line sensor that corresponds to each Red (R), green (G), and blue (B) color and that is currently used for picking up the image of a reflected light of a white light can be used for picking up the image of a fluorescence of the ultraviolet light in the image reader 10. Thus, only by adding the light source for the ultraviolet light in the image reader 10 that includes the light source for the white light, the first image data and the second image data can be generated by scanning once without increasing a number of components of the imaging reader 10.

Thus, increment in the number of components can be curbed compared to using two units including the light source and the imaging unit as in the first embodiment.

In the image reader 10 according to the second embodiment, when the imaging unit 16 captures the image of the imaging target medium P, the second light source 14 lights-up after the first light source 12 is lit-up. However, the present invention is not to be thus limited. The first light source 12 can be lit-up after the second light source 14 is lit-up.

Figure 7:
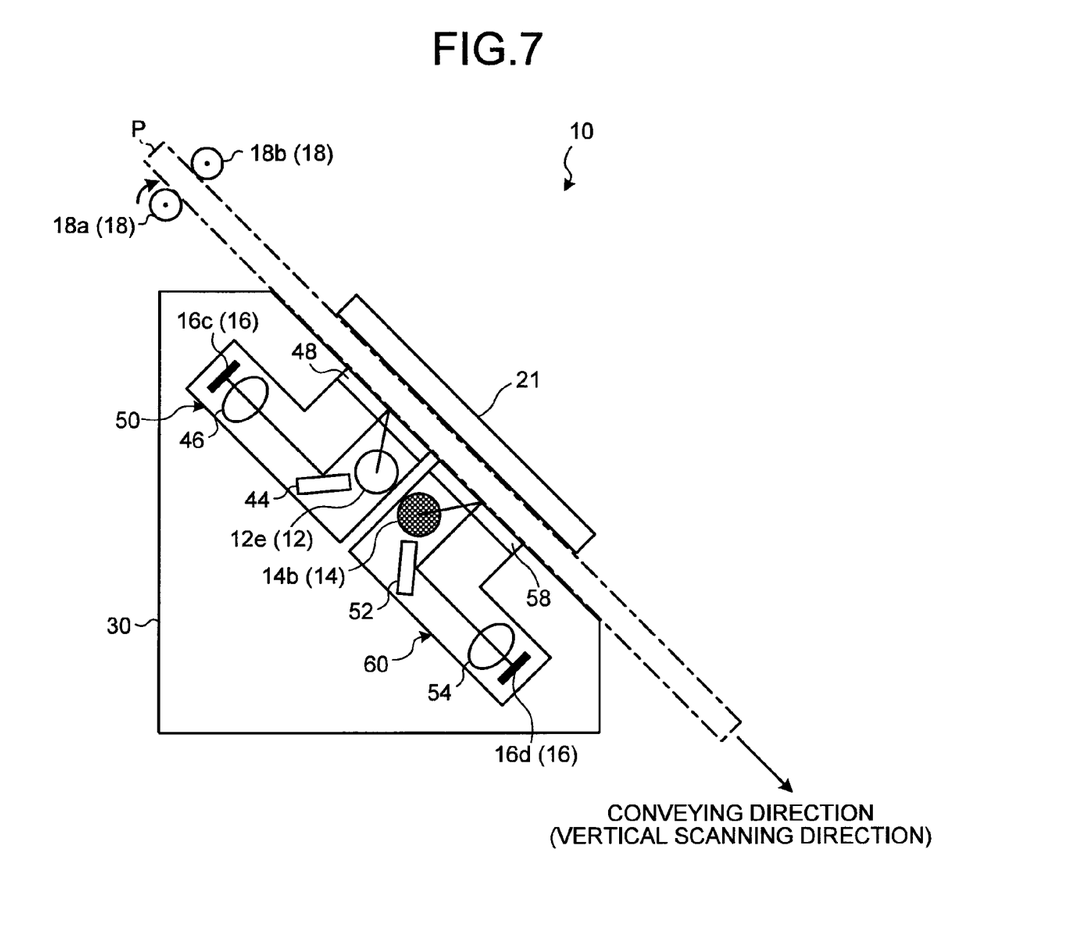
FIG. 7 is a schematic diagram for explaining an overview of a reference example of an image reader according to an embodiment of the present invention.
Figure 8:
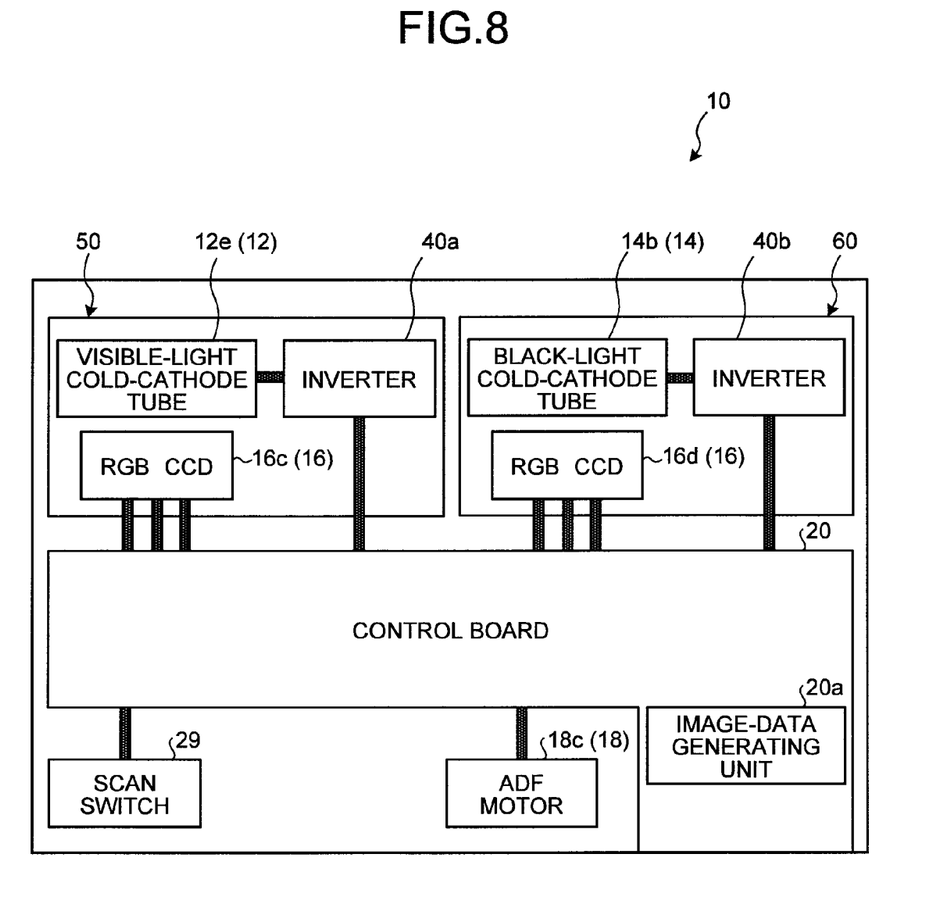
FIG. 8 is a block diagram of the reference example of the image reader according to the embodiment of the present invention.

A reference example of the image reader 10 according to an embodiment of the present invention is explained below. FIG. 7 is a schematic diagram for explaining an overview of the reference example of the image reader 10 according to the embodiment of the present invention. FIG. 8 is a block diagram of the reference example of the image reader 10. In the reference example of the image reader 10, same reference numerals are assigned to components similar to the components of the image reader 10 according to the first and the second embodiments and the redundant explanation is omitted.

In the reference example, a visible-light cold-cathode tube 12e is used as the first light source 12. The visible-light cold-cathode tube 12e is connected to an inverter 40a. Power is supplied from the inverter 40a to light-up the visible-light cold-cathode tube 12e and the visible-light cold-cathode tube 12e emits the white light that is the first light of the wavelength inside the visible spectrum on the imaging target medium P. The white light is formed of lights of various wavelengths that range between approximately 380 nm and approximately 780 nm. In the present reference example, the wavelength of the white light emitted from the visible-light cold-cathode tube 12e ranges between, for example, 380 nm and 780 nm.

In the reference example, a black-light cold-cathode tube 14b is used as the second light source 14. The black-light cold-cathode tube 14b is connected to an inverter 40b. Power is supplied from the inverter 40b to light-up the black-light cold-cathode tube 14b and the black-light cold-cathode tube 14b emits the ultraviolet light that is the second light of the wavelength outside the visible spectrum on the imaging target medium P. The ultraviolet light of the wavelength within approximately 200 nm to approximately 380 nm is desirable. In the present reference example, the wavelength of the ultraviolet light that is emitted from the black-light cold-cathode tube 14b is, for example, considered as 360 nm.

In the reference example, an image sensor 16c and an image sensor 16d that are three-line sensors are used as the imaging unit 16. The image sensors 16c and 16d are the CCD and are respectively formed of the R line sensor that responds only to the R light, the G line sensor that responds only to the G light, and the B line sensor that responds only to the B light. The R line sensor, the G line sensor, and the B line sensor are respectively formed of a plurality of imaging elements arranged in a single row in the main scanning direction.

The image sensor 16c forms an imaging unit 50 along with the visible-light cold-cathode tube 12e, a mirror 44 that reflects the reflected light from the imaging target medium P to the image sensor 16c, a lens 46 that converges the reflected light from the mirror 44 such that the image sensor 16c can pick up the image, and an image-reading supporting plate 48 for capturing the image of the imaging target medium P by using the white light from the visible-light cold-cathode tube 12e. When the visible-light cold-cathode tube 12e lights-up, the image sensor 16c picks up via the mirror 44 and the lens 46, the image of the reflected light of the white light irradiating a portion, from the imaging target medium P, facing the image-reading supporting plate 48.

The image sensor 16d forms an imaging unit 60 along with the black-light cold-cathode tube 14b, a mirror 52 that reflects the fluorescence from the imaging target medium P to the image sensor 16d, a lens 54 that converges the reflected light from the mirror 52 such that the image sensor 16d can pick up the image, and an image-reading supporting plate 58 for capturing the image of the imaging target medium P by using the ultraviolet light from the black-light cold-cathode tube 14b. When the black-light cold-cathode tube 14b lights-up, the image sensor 16d picks up via the mirror 52 and the lens 54, the image of the fluorescence of the ultraviolet light irradiating a portion, from the imaging target medium P, facing the image-reading supporting plate 58.

In the present reference example, the control board 20 that is the image-data generating unit generates by the image-data generating unit 20a, the visible light data group formed of the R line data, the G line data, and the B line data based on the reflected light of the wavelength inside the visible spectrum when the white light of the first light irradiates the imaging target medium P. Thus, by collecting the multiple visible light data group, the first image data of the imaging target medium P that is captured as the image by the image sensor 16c of the imaging unit 16 is generated. The control board 20 also generates the visible light external data group that is formed of the R line data, the G line data, and the B line data based on the fluorescence of the wavelength inside the visible spectrum when the ultraviolet light of the second light irradiates the imaging target medium P. Thus, by collecting the multiple visible light external data group, the second image data of the imaging target medium P that is captured as the image by the image sensor 16d of the imaging unit 16 is generated. In the reference example, the control board 20 that is the image-data generating unit generates by the image-data generating unit 20a, the visible light data group and the visible light external data group by parallel processes executed in time-sharing manner. The image-data generating unit 20a generates by collecting the multiple visible light data group, the first image data and also generates by collecting the multiple visible light external data group, the second image data.

Similarly as in the first and the second embodiments, the white reference plate 21 is used for updating the first white reference data and the second white reference data. However, in the reference example, the white reference plate 21 is facing the image-reading supporting plate 48 and the image-reading supporting plate 58. The white reference plate 21 curbs isolation or rise (separation) of the imaging target medium P from the image-reading supporting plate 48 or the image-reading supporting plate 58 at the time of conveying the imaging target medium P.

In the reference example of the image reader 10, when the conveying unit 18 conveys the imaging target medium P, the first light source 12 and the second light source 14 simultaneously light-up. To be specific, when the conveying unit 18 conveys the imaging target medium P, the image reader 10 simultaneously lights-up based on instructions output by the control board 20 to the inverters 40a and 40b, the visible-light cold-cathode tube 12e and the black-light cold-cathode tube 14b.

Operations, which are described in the reference example of the image reader 10, are explained below.

Upon turning on power of the image reader 10, the imaging target medium P is set in the sheet feeding unit (not shown) of the image reader 10. Upon pressing the scan switch 29, similarly as in the first and the second embodiments, the ADF motor 18c of the conveying unit 18 drives and by the driving roller 18a and the driven roller 18b, the imaging target medium P is conveyed along the conveying direction (vertical scanning direction) of the imaging target medium P. In the reference example, the imaging target medium P is conveyed to the image sensors 16c and 16d of the imaging unit 16.

If the visible-light cold-cathode tube 12e of the first light source 12 and the black-light cold-cathode tube 14b of the second light source 14 simultaneously light-up when the imaging target medium P is conveyed to the image sensors 16c and 16d of the imaging unit 16 by the driving roller 18a and the driven roller 18b, the image-data generating unit 20a of the control board 20 generates the visible light data group that is based on the reflected light, of the wavelength inside the visible spectrum, of the white light that is the first light and the visible light external data group that is based on the fluorescence, of the wavelength inside the visible spectrum, of the ultraviolet light that is the second light by the parallel processes executed in the time-sharing manner. Consequently, by collecting the multiple visible light data group, the first image data, based on the white light of the first light, of the imaging target medium P that is captured as the image by the image sensor 16c of the imaging unit 16 is generated. Furthermore, by collecting the multiple visible light external data group, the second image data, based on the ultraviolet light of the second light, of the imaging target medium P that is captured as the image by the image sensor 16d of the imaging unit 16 is generated.

Thus, similarly as in the first and second embodiments, the first image data and the second image data can be generated by single scanning operation. In other words, by scanning the imaging target medium P once, the picked-up image data that is based on the white light that is the light of the wavelength inside the visible spectrum and the picked-up image data that is based on the ultraviolet light that is the light of the wavelength outside the visible spectrum can be generated from the imaging target medium P.

In the reference example of the image reader 10, when irradiated by the white light of the visible-light cold-cathode tube 12e, the white reference plate 21 can be used for updating the first white reference data that is the base for correcting the first image data, and when irradiated by the ultraviolet light of the black-light cold-cathode tube 14b, the white reference plate 21 can also be used for updating the second white reference data that is the base for correcting the second image data.

According to embodiments of the present invention, if a first light source and a second light source alternately light-up when a conveying unit conveys an imaging target medium, a visible light data group that is based on a reflected light, of a wavelength inside a visible spectrum, of a first light and a visible light external data group that is based on a reflected light, of the wavelength inside the visible spectrum, of a second light are alternately generated. From the alternately generated multiple visible light data group and the multiple visible light external data group, by collecting the multiple visible light data group, first image data corresponding to the imaging target medium is generated and by collecting the multiple visible light external data group, second image data corresponding to the imaging target medium is generated. As mentioned earlier, by scanning the imaging target medium once, the first image data and the second image data corresponding to the imaging target medium can be generated. In other words, by scanning once, picked-up image data that is based on a light of the wavelength inside the visible spectrum and picked-up image data that is based on a light of a wavelength outside the visible spectrum can be generated from the imaging target medium.

According to the embodiments, a single imaging unit can pick up an image of the reflected light of the first light and also pick up an image of the reflected light of the second light. Due to this, arranging an imaging unit that picks up the image of the reflected light of the first light and an imaging unit that picks up the image of the reflected light of the second light is not necessary. Thus, an image reader can be miniaturized.

In the embodiments, each LED such as an RLED, a GLED, a BLED, and a UVLED sequentially lights-up one by one, thus sequentially generating R line data, G line data, B line data, and UV line data one by one. Consequently, line data corresponding to four LED colors is successively generated during each cycle of lighting-up of the RLED, GLED, BLED, and the UVLED. The four-color successive line data represents the R line data, the G line data, and the B line data forming the visible light data group and the UV line data forming an ultraviolet light data group that is the visible light external data group. In other words, the line data corresponding to the successive three colors such as the R line data, the G line data, and the B line data, forming the visible light data group, that sandwich the UV line data forming the ultraviolet light data group is repeatedly generated. Thus, the percentage of the UV line data, forming the ultraviolet line data group, in the line data generated during each cycle of lighting-up of the RLED, the GLED, and the BLED is minimized. Due to this, a reproduction accuracy of the first image data generated by collecting the multiple visible light data group with respect to the imaging target medium P can be enhanced compared to when the percentage of the R line data, the G line data, and the B line data forming the visible light data group is similar to the percentage of the UV line data forming the ultraviolet data group among the line data generated during each cycle of lighting-up of the RLED, the GLED, the BLED, and the UVLED.

In the embodiments, a line sensor that is currently used for picking up the image of the reflected light of the white light can be used for picking up the image of the fluorescence of the ultraviolet light. Thus, only by adding the light source for the ultraviolet light in the imaging unit including the light source for the white light, the first image data and the second image data can be generated by scanning once without increasing a number of components. Furthermore, for example, the RLED, the GLED, and the BLED of the first light source and the UVLED of the second light source can be included in a single unit. Thus, increment in the number of components can be curbed compared to using two units including the light source and the imaging unit.

In the embodiments, if a three-line sensor captures the image when the UVLED is lit-up, the ultraviolet light data group that is the visible light external data group is formed of the R line data, the G line data, and the B line data. Thus, because the ultraviolet light data group becomes full color line data, the second image data generated by collecting the multiple visible light data group can be defined as the full color image data.

According to the embodiments, the three-line sensor that corresponds to each Red (R), green (G), and blue (B) color and that is currently used for picking up the image of the reflected light of the white light can be used for picking up the fluorescence image caused by the ultraviolet light. Thus, only by adding a light source for the ultraviolet light in an imaging unit that includes a light source for the white light, the first image data and the second image data can be generated by scanning once without increasing a number of components of the imaging unit. Thus, increment in the number of components can be curbed compared to using two units including the light source and the imaging unit.

According to the embodiments, when irradiated by the white light, a white reference plate can be used for updating the first white reference data that is the base for correcting the first image data. When irradiated by the ultraviolet light, the white reference plate can be used for updating the second white reference data that is the base for correcting the second image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reader comprising:
   a first light source that irradiates an imaging target medium with a first light inside a visible spectrum;
   a second light source that irradiates the imaging target medium with a second light outside the visible spectrum;
   an imaging unit that captures, based on a reflected light inside the visible spectrum from the imaging target medium, an image of the imaging target medium;
   a conveying unit that conveys the imaging target medium to the imaging unit; and
   an image-data generating unit that generates a visible light data group corresponding to a portion of the imaging target medium that is captured by the imaging unit when the imaging target medium is irradiated by only the first light and a visible light external data group corresponding to a portion of the imaging target medium that is captured by the imaging unit when the imaging target medium is irradiated by only the second light, wherein
   the first light source and the second light source alternately light-up at the time of conveying the imaging target medium by the conveying unit,
   the first light source is formed of a white LED that irradiates a white light,
   the second light source is formed of an ultraviolet LED that emits an ultraviolet light,
   the imaging unit includes a three-line sensor formed of an R line sensor that responds only to an R light, a G line sensor that responds only to a G light, and a B line sensor that responds only to a B light, and that is respectively formed of a plurality of imaging elements arranged in a single row in a main scanning direction, and
   the image-data generating unit generates the visible light data group that is formed of R line data corresponding to the R light that is picked up by the R line sensor, G line data corresponding to the G light that is picked up by the G line sensor, and B line data corresponding to the B light that is picked up by the B line sensor at the time of lighting-up of the white LED, and generates the visible light external data group that is formed of the R line data corresponding to the R light that is picked up by the R line sensor, the G line data corresponding to the G light that is picked up by the G line sensor, and the B line data corresponding to the B light that is picked up by the B line sensor at the time of lighting-up of the ultraviolet LED, so that the visible light data group and the visible light external data group are generated by conveying the imaging target medium once by the conveying unit.

2. An image reading method for an image reader, which comprises a white LED that irradiates a white light, an ultraviolet LED that emits an ultraviolet light, and a three-line sensor formed of an R line sensor that responds only to an R light, a G line sensor that responds only to a G light, and a B line sensor that responds only to a B light, and that is respectively formed of a plurality of imaging elements arranged in a single row in a main scanning direction to capture an image on an imaging target medium, the image reading method comprising:
   conveying the imaging target medium along a conveying direction;
   lighting-up the white LED;
   capturing the image by the three-line sensor, based on the white light reflected on the imaging target medium;
   simultaneously outputting R line data, G line data, and B line data based on the captured image;
   turning-off the white LED;
   generating a visible light data group formed of the R line data, the G line data, and the B line data;
   lighting-up the ultraviolet LED;
   capturing the image of fluorescence by the three-line sensor, based on the ultraviolet light reflected on the imaging target medium;
   simultaneously outputting the R line data, the G line data, and the B line data based on the captured image;
   turning-off the ultraviolet LED; and
   generating a visible light external data group formed of the R line data, the G line data, and the B line data.

* * * * *